United States Patent
Lu et al.

(10) Patent No.: US 11,226,055 B1
(45) Date of Patent: Jan. 18, 2022

(54) FLUID CONTROL VALVE WITH MECHANICAL SWITCH

(71) Applicants: Shun-Tsung Lu, Taichung (TW);
Ta-Wei Lu, Taichung (TW)

(72) Inventors: Shun-Tsung Lu, Taichung (TW);
Ta-Wei Lu, Taichung (TW)

(*) Notice: Subject to any disclaimer, the term of this patent is extended or adjusted under 35 U.S.C. 154(b) by 0 days.

(21) Appl. No.: 17/130,834

(22) Filed: Dec. 22, 2020

(51) Int. Cl.
*F16K 15/00* (2006.01)
*F16K 31/165* (2006.01)

(52) U.S. Cl.
CPC ....... *F16K 31/165* (2013.01); *Y10T 137/7869* (2015.04); *Y10T 137/7931* (2015.04)

(58) Field of Classification Search
CPC ........ F16K 1/52; F16K 15/028; F16K 17/044; F16K 17/06; Y10T 137/5153; Y10T 137/7869; Y10T 137/7876; Y10T 137/7878; Y10T 137/7906; Y10T 137/7931; Y10T 137/7932
See application file for complete search history.

(56) References Cited

U.S. PATENT DOCUMENTS

| | | | | |
|---|---|---|---|---|
| 572,580 A * | 12/1896 | Spitzenberg | ............ | F16K 41/10 251/278 |
| 2,767,733 A * | 10/1956 | Anderson | ............ | G05D 7/0106 137/497 |
| 3,116,752 A * | 1/1964 | Duncan | .................. | B60R 25/08 137/384.6 |
| 3,331,389 A * | 7/1967 | Kirk | ........................ | F16K 17/30 137/516.11 |
| 4,391,328 A * | 7/1983 | Aumann | ................. | E21B 34/08 166/321 |

\* cited by examiner

*Primary Examiner* — Robert K Arundale
(74) *Attorney, Agent, or Firm* — Muncy, Geissler, Olds & Lowe, P.C.

(57) ABSTRACT

A fluid control valve with mechanical switch is a tube body having a seat portion in the through hole. A rod body passes through the bore of the seat portion, with two ends of the rod body provided with a block member and a valve plate, respectively. The rod body has an elastic member between the seat portion and the block portion, and another elastic member between the seat portion and the valve plate. The rod body further includes an adjustment member for adjusting the compression level of at least one elastic member, so as to adjust the prestress difference between the two elastic members, thereby adjusting the valve plate to normally open or close according to the movement of the rod body.

8 Claims, 7 Drawing Sheets

FIG. 7

FLUID CONTROL VALVE WITH MECHANICAL SWITCH

BACKGROUND OF THE INVENTION

1. Field of the Invention

The present invention relates to fluid control valves, and more particularly, to a fluid control valve with mechanical switch.

2. Description of the Related Art

The valve body applied for fluid controlling, such as a known switch valve, usually applies an electronic pressure detection mechanism. When the fluid reaches a certain degree of pressure, the electronic switch controls the valve open or close accordingly, so as to control if the fluid can pass the switch. Alternatively, a known non-return valve usually applies a mechanical structure having a non-return member which is unidirectionally pushed by a single spring, allowing the fluid to push open the non-return valve for passing therethrough in a single direction, with a non-return function for preventing the fluid from reversely flowing back.

However, a conventional switch valve is not a pure mechanical structure. Although the valve door can open or close when the pressure reaches a certain degree, the valve shall have an electronic switch component for controlling, so that the cost of components and maintenance thereof remain high. Also, although the conventional non-return valve can operate with simple mechanical structure, the non-return valve itself only has the function of preventing the fluid from reversely flowing back, lacking the function of the aforementioned switch for opening or closing the valve door.

SUMMARY OF THE INVENTION

To improve the issues above, a fluid control valve with mechanical switch is disclosed, which is adjustable between a normally open or close status through a pure mechanical structure as a switch valve for controlling the flowing of the fluid.

For achieving the aforementioned objectives, a fluid control valve with mechanical switch in accordance with an embodiment of the present invention is provided, comprising a tube body, a rod body, a first elastic member, a second elastic member, and at least an adjustment member. The tube body comprises a through hole, with an entrance and an exit disposed on two ends of the tube body. The tube body has a seat portion in the through hole, and the seat portion comprises a bore extending along an axial direction of the tube body. The rod body movably passes through the bore, with one end of the rod body extending toward the entrance and having a block member, and another end of the rod body extending toward the exit and having a valve plate. The valve plate opens or closes the exit according to the axial movement of the rod body. The first elastic member is mounted around the rod body and arranged between the seat portion and the block member. The first elastic member is pressurized to be provided with a first prestress for elastic recovering. The second elastic member is mounted around the rod body and arranged between the seat portion and the valve plate. The second elastic member is pressurized to be provided with a second prestress for elastic recovering. The at least an adjustment member is disposed on the rod body for adjusting the compression level of the first elastic member and/or the second elastic member, so as to adjust the first prestress to be greater than the second prestress for the valve plate to normally close, or to adjust the second prestress to be greater than the first prestress for the valve plate to normally open. When the valve plate normally closes, the fluid shall has a thrust greater than the pressure difference between the first prestress and the second prestress, so as to push open the valve plate and pass therethrough. In contrast, when the valve plate normally opens, if the back pressure of the fluid greater than the pressure difference between the second prestress and the first prestress, the plate will be pushed toward the exit by the back pressure to close.

With such configuration, the fluid control valve of the present invention purely applies the mechanical switch for adjusting the compression level of the first elastic member and/or second elastic member, thereby adjusting the first prestress to be greater or smaller than the second prestress, such that the valve plate normally closes or opens with respect to the exit, thus controlling if the fluid can pass therethrough. Such operation manner is different from the electronic switch valve applying the electronic switch, so that the component cost is relatively lower, and the maintenance and assembling operation is easier.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, the fluid control valve 100 with mechanical switch in accordance with the present invention comprises a tube body 10, a rod body 20, a first elastic member 30, a second elastic member 40, and an adjustment member.

Figure 1:
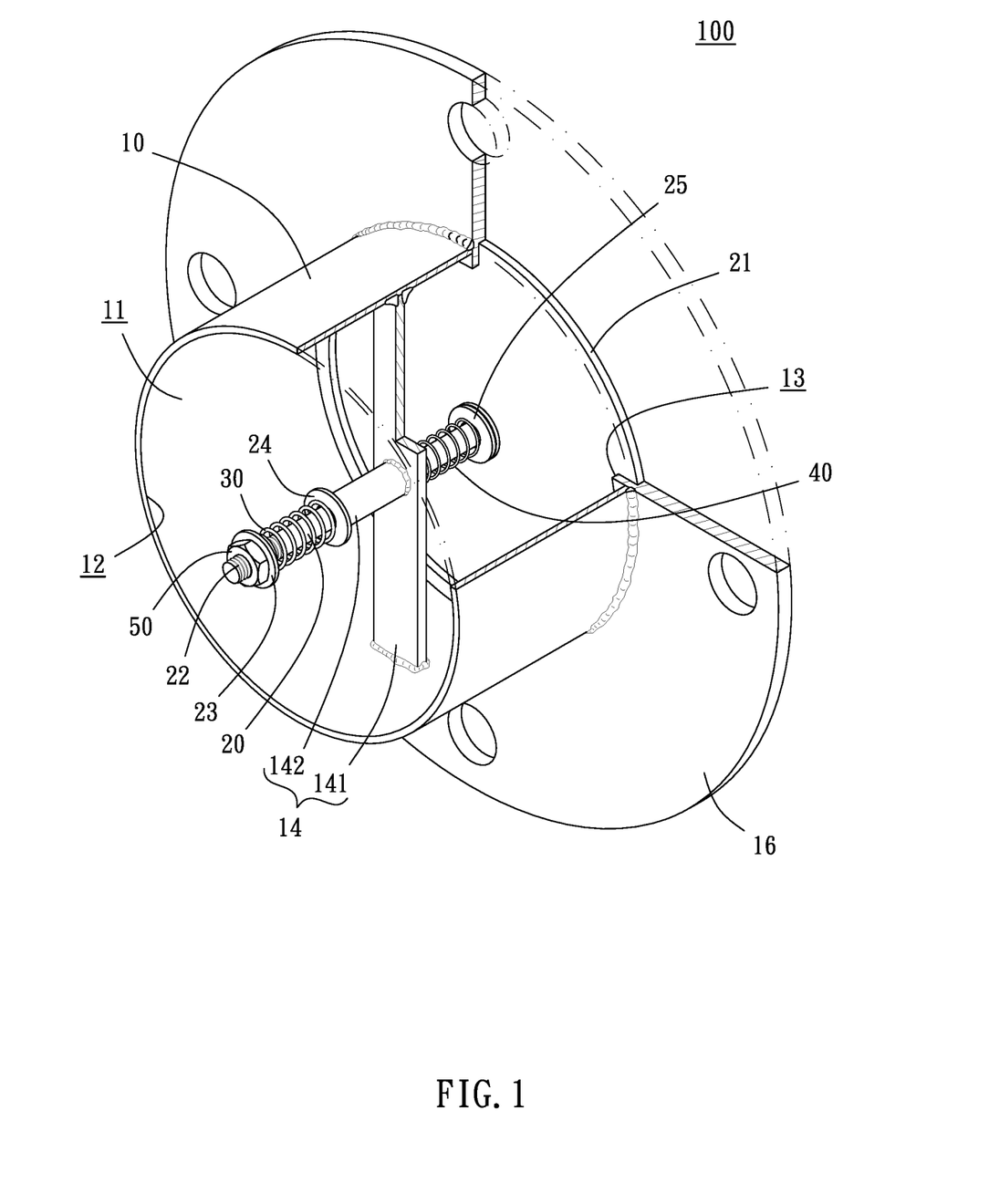
FIG. 1 is a perspective view of the fluid control valve in accordance with the first embodiment of the present invention.
Figure 2:
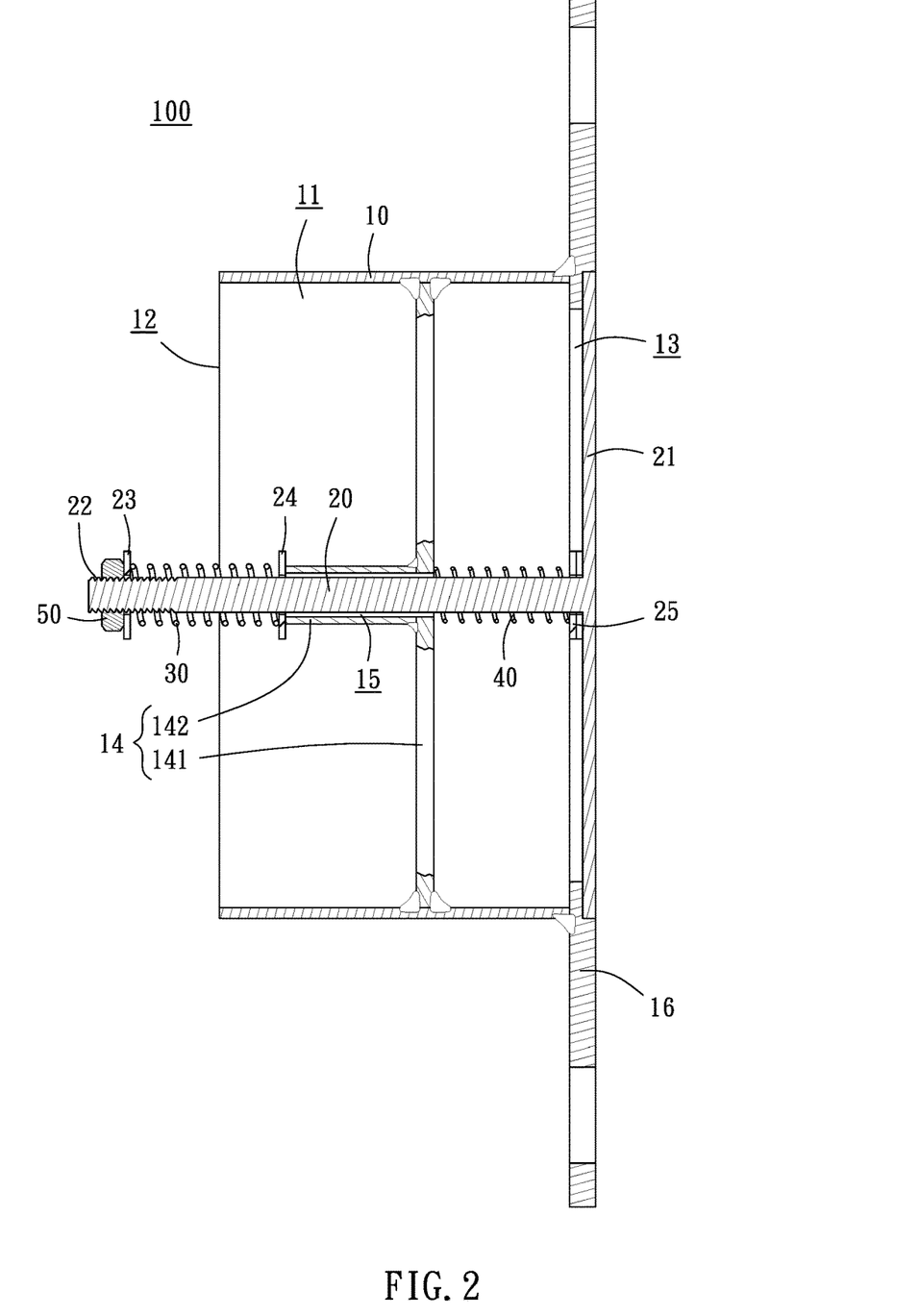
FIG. 2 is a plane exploded view of the fluid control valve in accordance with the first embodiment of the present invention.

The tube body 10, in the embodiment, is formed in a hollow circular tube shape and provided with a through hole 11. The tube body 10 has an entrance 12 and an exit 13 on two ends thereof. In other words, the entrance 12 and the exit 13 are in communication through two ends of the tube body 10 through the through hole 11. The tube body 10 comprises a seat portion 14 in the through hole, and the seat portion 14 comprises a bore 15 which axially extends along the tube body 10. In a preferred embodiment, the seat portion 14 comprises a support rack 141 and a stand pipe 142. The support rack 141 is arranged along an radial direction of the tube body 10 in the through hole 11 and fixed to the tube body 10 with two ends of the support rack 141. The stand pipe 142, in the embodiment, is arranged to stand on one side of the support rack 141 facing the entrance, wherein the stand pipe 142 is hollow and passes through the support rack. 141 to form the bore 15. Also, in the embodiment, the tube body 10 comprises a ring flange 16 on one end provided with the exit 13, such that the tube body 10 is connected with other tube components through the ring flange 16.

The rod body 20 movably passes through the bore 15. In other words, the rod body 20 is allowed to freely move along the extending direction of the bore 15. The rod body 20 comprises a block member on one end extending toward the entrance 12, and a valve plate 21 on another end extending toward the exit 13. The valve plate 21 selectively opens or closes the exit 13 according to the axial movement of the rod body 20. In a preferred embodiment, the rod body 20 comprises a first thread section 22 on one end extending; toward the entrance 12, and the valve plate 21 is formed in a circular plate corresponding to the exit 13.

The first elastic member 30 is mounted around the rod body 20 and placed between the seat portion 14 and the block portion. The second elastic member 40 is mounted around the rod body 20 and placed between the seat portion 14 and the valve plate 21. When being pressurized between the seat portion 14 and the block member, the first elastic member 30 is provided with a first prestress for carrying out an elastic recovering process of the first elastic member 30. Similarly, when being pressurized between the seat portion 14 and the valve plate 21, the second elastic member 40 is provided with a second prestress for carrying out an elastic recovering process of the second elastic member 40, In the embodiment, the first elastic member 30 and the second elastic member 40 are, for example but not limited to, a compression spring.

Figure 3:
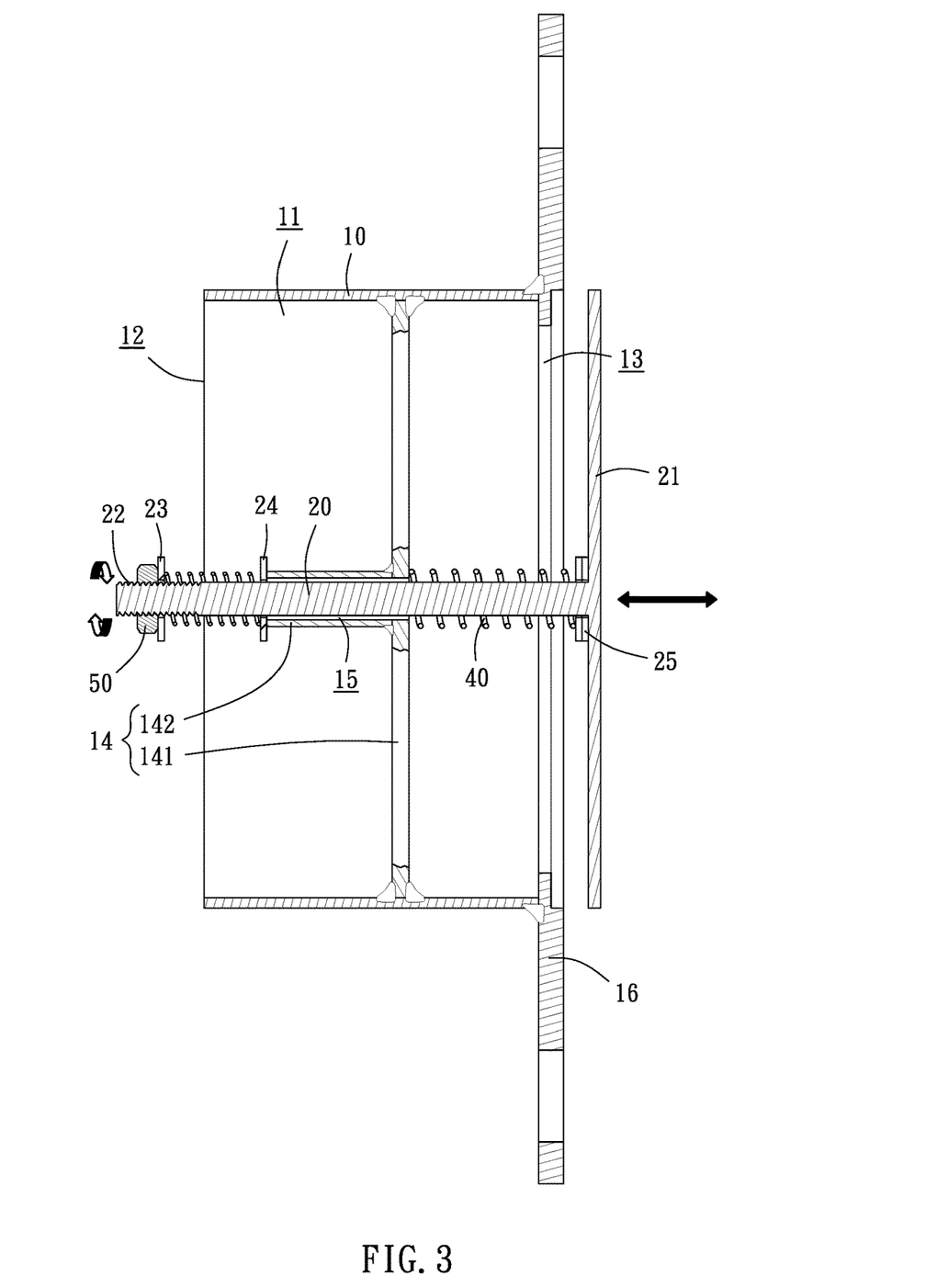
FIG. 3 is a schematic view illustrating the adjustment of the adjustment member in FIG. 2.

In the embodiment, the amount of the adjustment member is one, and the adjustments a first nut 50 which is screwed to the first thread section 22. In the embodiment, the block member is a washer 23. One end of the first nut 50 abuts against one end of the first elastic member 30 with the washer 23 arranged therebetween, wherein the first nut 50 is rotated on the first thread section 22 for adjusting the compression level of the first elastic member 30. At the same time, the first elastic member 30 is adjusted to ensure that the first prestress is greater than the second prestress of the second elastic member 40, so that the valve plate 21 normally closes. Alternatively, the first elastic member 30 is adjusted to ensure that the first prestress is smaller than the second prestress of the second elastic member 40 (i.e. the second prestress greater than the first prestress), so that the valve plate 21 normally opens. Thus, when the valve plate 21 normally closes, the fluid shall have a thrust greater than the pressure difference between the first prestress and the second prestress, so as to push open the valve plate 21 and passes through the exit 13. When the valve plate 21 normally opens, if the back pressure of the fluid is greater than the pressure difference between the second prestress and the first prestress, the valve plate 21 is pushed toward the exit 13 by the back pressure to close.

In a preferred embodiment, another end of the first elastic member 30 away from the first nut 50 abuts against the stand pipe 142 with another washer 24 arranged therebetween. In the embodiment, one end of the second elastic member 40 directly abuts against the support rack 141, and another end of the second elastic member 40 abuts against the valve plate 21 with a washer 25 arranged therebetween. Thus in the embodiment, by only adjusting the compression level of the first elastic member 30 through the first nut 50, the second elastic member 40 will stretch or retract according to the adjustment of the first elastic member 30, thereby adjusting the pressure difference between the first prestress and the second prestress.

Figure 4:
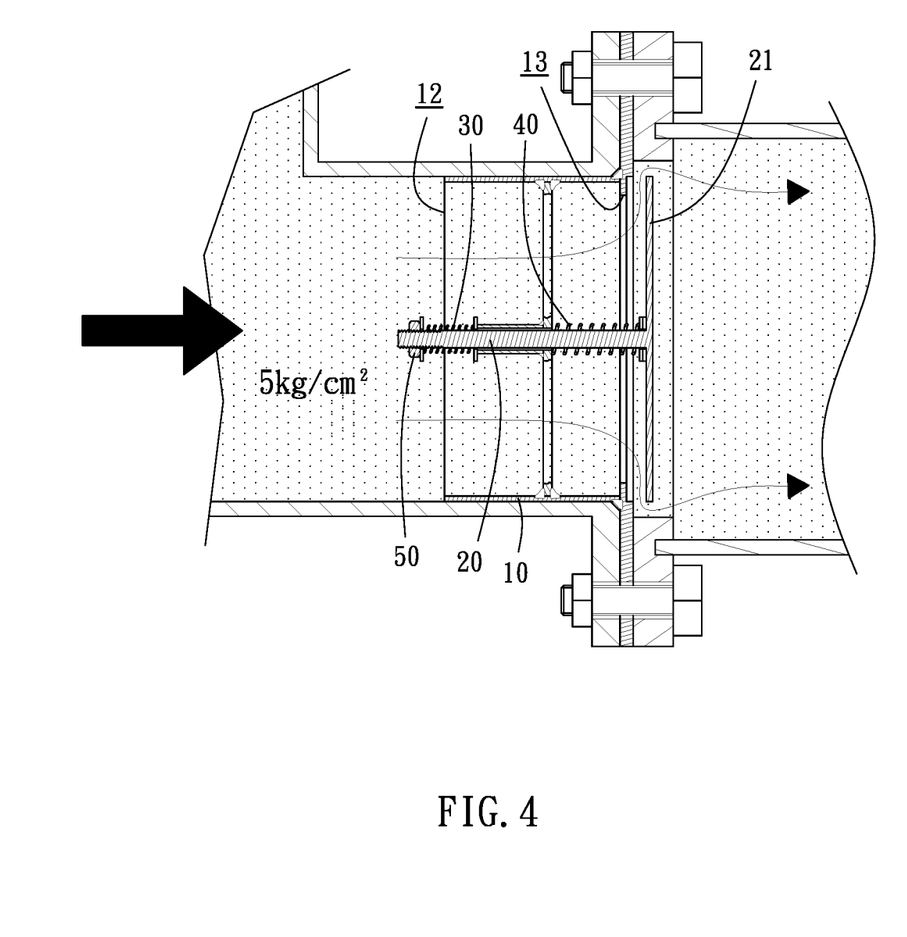
FIG. 4 is a schematic view illustrating the valve plate in the first embodiment normally opening for water to pass therethrough.
Figure 5:
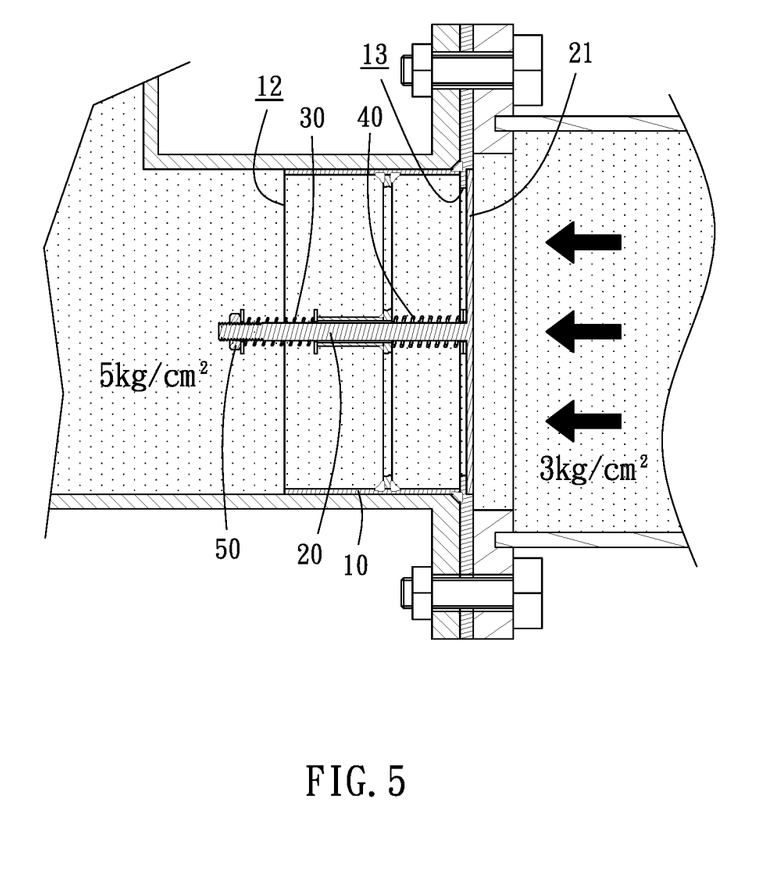
FIG. 5 is a schematic view illustrating the valve plate in the first embodiment closing the exit when bearing the back pressure.

The fluid control valve 100 in the aforementioned embodiment, when applied as a switch valve for water inflow, such as being installed on a water storage bucket (not shown, only illustrated with a sealed bucket as example) for water supply, uses the first nut 50 to loosen the first elastic member 30 for assuring that the compression level of the first elastic member 30 is smaller than that of the second elastic member 40, such that the second prestress is 5 kg/cm$^2$ and the first prestress is 3 kg/cm$^2$. Thus, because the second prestress is greater than the first prestress by 2 kg/cm$^2$, the valve plate 21 is pushed away from the exit 13 by the second elastic member 40, so as to normally open (as shown by FIG. 4). If the water pressure of the water entering from the entrance 12 is 5 kg/cm$^2$, when the exit 13 opens, the water can pass through the entrance 12 into the water storage bucket until the water pressure in the water storage bucket forms a back pressure for the valve plate 21, and the back pressure will gradually increase and become greater than the pressure difference of 2 kg/cm$^2$ between the second prestress and the first prestress (for example, reaching 3 kg/cm$^2$). In the moment, the water pressure in the water storage bucket forms a back pressure on the valve plate 21, and the back pressure will gradually become greater than the pressure difference of 2 kg/cm$^2$ between the second prestress and the first prestress. Accordingly, the water pressure in the water storage bucket forms a back pressure on the valve plate 21, and this back pressure will gradually become greater than the pressure difference of 2 kg/cm$^2$ between the second prestress and the first prestress, whereby the valve plate 21 is pushed back toward the exit 13 to close (as shown by FIG. 5). Therefore, the water storage bucket s prevented from tracking, and the fluid control valve 100 is therefore considered as a safe valve which can be closed with a predetermined pressure.

Figure 6:
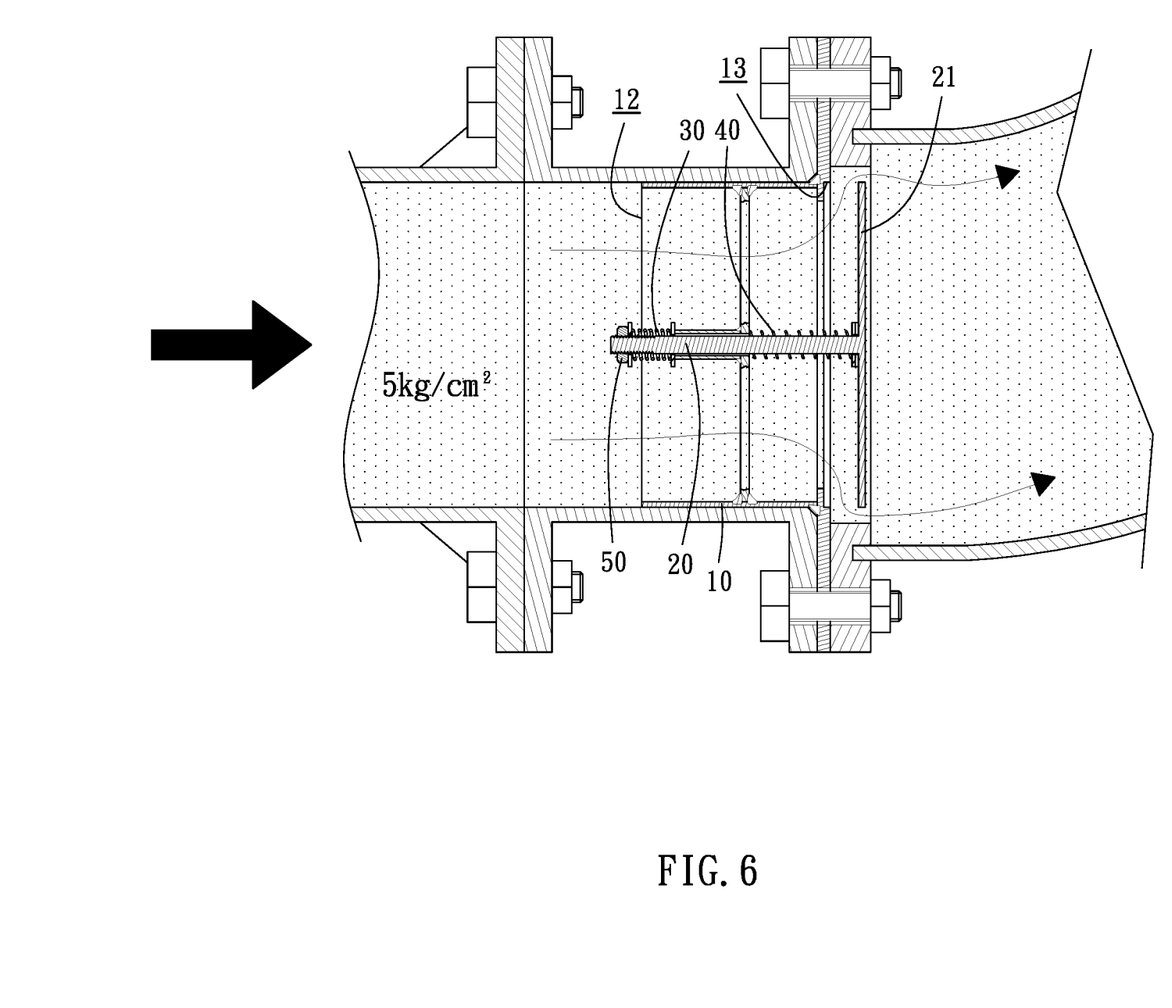
FIG. 6 is a schematic view illustrating the valve plate being pushed open by water.

For another example, if the fluid control valve 100 is installed on a conventional syphon type power generation device (not shown) as a switch valve for water supply, in which the water supply shall have a water pressure of at least 5 kg/cm$^2$ for optimal performance during power generation, the first nut 50 is used for fastening the first elastic member 30 for assuring that the compression level of the first elastic member 30 is greater than that of the second elastic member 40, wherein the second prestress is 3 kg/cm$^2$ and the first prestress is 8 kg/cm$^2$. Therefore, because the prestress is greater than the second prestress by 5 kg/cm$^2$, the valve plate 21 is pulled toward the exit by the first elastic member 30 to normally close. If the water pressure of the water inflowing from the entrance 12 is only 3 g/cm$^2$, the valve plate 21 is not pushed open and remains closed. When the water pressure of the water inflowing from the entrance 12 reaches 5 kg/cm$^2$, the valve plate 21 will be pushed open (as shown by FIG. 6), and the water passes therethrough to facilitate the syphon type power generation. Thus, the fluid control valve 100 is considered as a switch valve which can be opened with a predetermined pressure.

With the foregoing configuration, functions of the present invention will be illustrated below. The fluid control valve 100 of the present invention is a pure mechanical structure with the application of mechanical switch. By adjusting the compression levels of the first elastic member 30 and the second elastic member 40 through by use of the adjustment member (as the first nut 50 above), the pressure difference between the first prestress and the second prestress is adjusted, whereby the valve plate 21 normally opens or closes with respect to the exit 13 for controlling the fluid flow therethrough. Compared with conventional electronic switch valve applying an electronic switch, cost of the components of the present invention is lower, and the maintenance thereof is easier.

Figure 7:
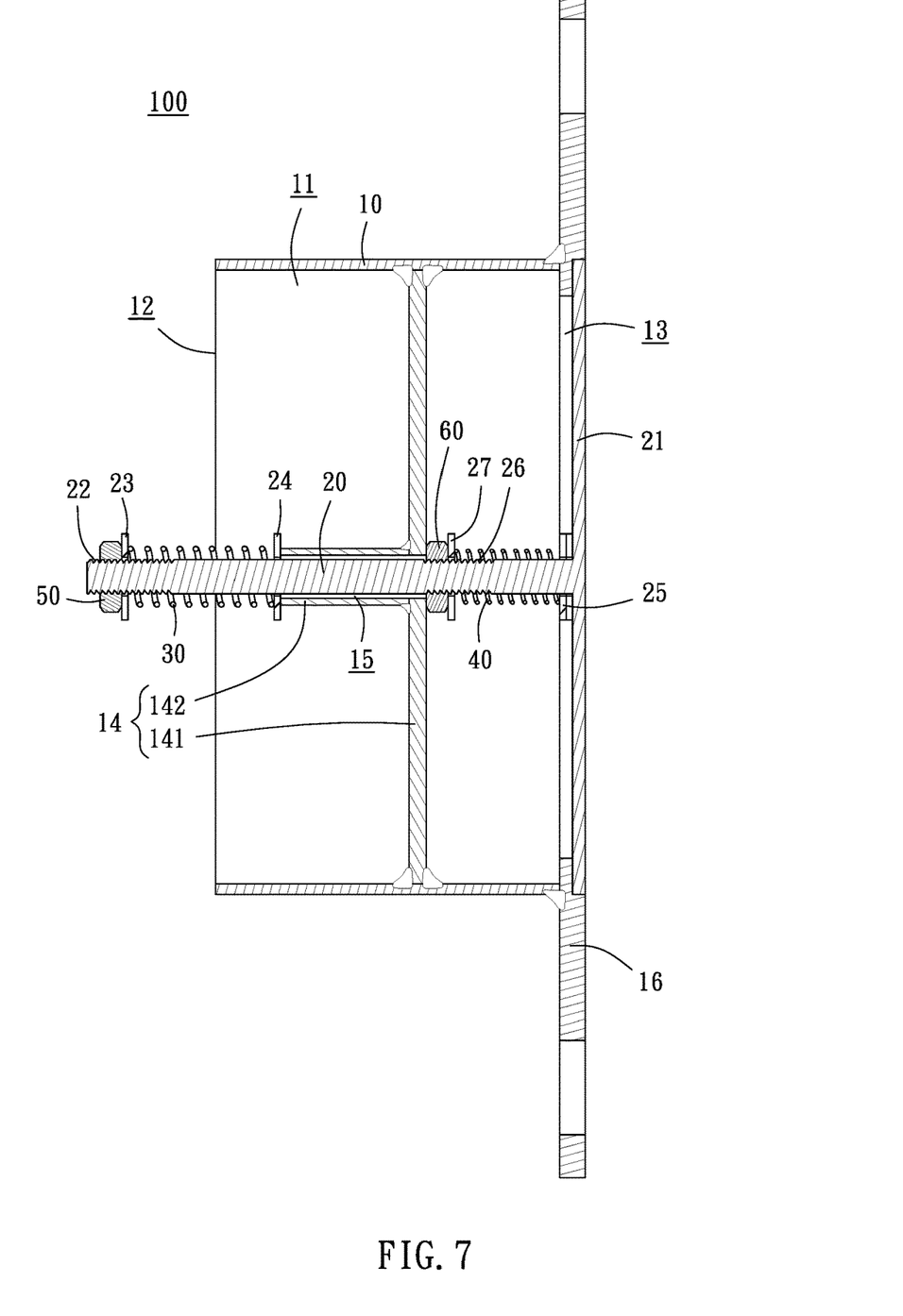
FIG. 7 is a plane exploded view of the fluid control valve in accordance with the second embodiment of the present invention.

The present invention still comprises different embodiments. As shown by FIG. 7, the second embodiment is illustrated. The difference between the second embodiment and the first embodiment is that the rod body 20 comprises a second thread section 26, and a second nut 60 is also included as the adjustment member. The second thread section 26 is disposed on a section of the rod body 20 on which the second elastic member 40 is mounted around. The second nut 60 is screwed to the second thread section 26, and the second nut 60 abuts against the second elastic member 40 with a washer 27 arranged therebetween, and the second elastic member 40 still abuts against the valve plate 21 with the washer 25 arranged therebetween. The second nut 60 is rotated on the second thread section 26 for adjusting the compression level of the second elastic member 40. Therefore, a similar function in the first embodiment is achieved. Additionally, by adjusting the compression level of the second elastic member 40 through the second nut 60, the first prestress of the first elastic member 30 and the second prestress of the second elastic member 40 can be adjusted more flexibly.

Notably, the fluid to which the fluid control valve 100 is applied is not limited to the water in the embodiments above, and is allowed to be the gas of a pneumatic application of the liquid of a hydraulic application. Further, the material used for forming the components such as the tube body 10 and the rod body 20 can be selected accordingly to different characteristics of the fluids. For example, the tube body 10 is not limited to specific materials, and can be formed of Teflon which is acid and alkali-resistant, or ceramic material which is resistant to high and low temperature and uneasy to be softened or hardened, or white iron which is resistant to rustiness. Also, multiple fluid control valves 100 of the present invention are allowed to be connected in series according to usage demands, so that the flexibility of the application thereof is improved.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fluid control valve with mechanical switch, comprising:
   - a hollow tube body comprising a through hole, with an entrance and an exit disposed on two ends of the tube body, and a seat portion disposed in the through hole, the seat portion comprising a bore extending along an axial direction of the tube body;
   - a rod body movably passing through the bore, with one end of the rod body extending toward the entrance and having a block member, and another end of the rod body extending toward the exit and having a valve plate, the valve plate opening or closing the exit according to an axial movement of the rod body along the axial direction;
   - a first elastic member mounted around the rod body and arranged between the seat portion and the block member, the first elastic member being pressurized to be provided with a first prestress for an elastic recovering process;
   - a second elastic member mounted around the rod body and arranged between the seat portion and the valve plate, the second elastic member being pressurized to be provided with a second prestress for an elastic recovering process; and
   - at least an adjustment member disposed on the rod body for adjusting a compression level of the first elastic member and/or the second elastic member, so as to adjust the first prestress to be greater than the second prestress for the valve plate to normally close, or to adjust the second prestress to be greater than the first prestress for the valve plate to normally open;
   - wherein the seat portion comprises a support rack and a stand pipe; the support rack is arranged along a radial direction of the tube body in the through hole and fixed to the tube body with two ends of the support rack; the stand pipe is arranged to stand on one side of the support rack facing the entrance; the stand pipe is hollow and passes through the support rack to form the bore.

2. A fluid control valve with mechanical switch, comprising:
   - a hollow tube body comprising a through hole, with an entrance and an exit disposed on two ends of the tube body, and a seat portion disposed in the through hole, the seat portion comprising a bore extending along an axial direction of the tube body;
   - a rod body movably passing through the bore, with one end of the rod body extending toward the entrance and having a block member, and another end of the rod body extending toward the exit and having a valve plate, the valve plate opening or closing the exit according to an axial movement of the rod body along the axial direction;
   - a first elastic member mounted around the rod body and arranged between the seat portion and the block member, the first elastic member being pressurized to be provided with a first prestress for an elastic recovering process;
   - a second elastic member mounted around the rod body and arranged between the seat portion and the valve plate, the second elastic member being pressurized to be provided with a second prestress for an elastic recovering process; and
   - at least an adjustment member disposed on the rod body for adjusting a compression level of the first elastic member and/or the second elastic member, so as to adjust the first prestress to be greater than the second prestress for the valve plate to normally close, or to adjust the second prestress to be greater than the first prestress for the valve plate to normally open;
   - wherein the rod body comprises a first thread section on one end extending toward the entrance; the adjustment member is a nut screwed to the thread section; the block member is a washer; the nut abuts against one end of the first elastic member with the washer arranged between the nut and the first elastic member, such that the nut is rotated on the thread section for adjusting the compression level of the first elastic member.

3. The fluid control valve of claim 2, wherein another end of the first elastic member away from the nut abuts against the stand pipe with another washer arranged between the first elastic member and the stand pipe.

4. The fluid control valve of claim 2, wherein one end of the second elastic member directly abuts against the support rack, and another end of the second elastic member abuts against the valve plate with a washer arranged between the second elastic member and the valve plate.

5. The fluid control valve of claim 2, wherein the rod body comprises a first thread section which is the aforementioned thread section and a second thread section; the adjustment member comprises a first nut which is the aforementioned nut and a second nut; the second thread section is a section of the rod body to which the second elastic member is mounted around, and the second nut is screwed to the second thread section; the second nut abuts against the second elastic member with a washer arranged between the second nut and the second elastic member, and the second elastic member abuts against the valve plate with another washer arranged between the second elastic member and the valve plate, such that the second nut is rotated on the second thread section for adjusting the compression level of the second elastic member.

6. The fluid control valve of claim 1, wherein the rod body comprises a thread section to which the second elastic member is mounted around; the adjustment member is a nut screwed to the thread section; the nut abuts against the second elastic member with a washer arranged between the nut and the second elastic member, such that the nut is rotated on the thread section for adjusting the compression level of the second elastic member.

7. The fluid control valve of claim 1, wherein the first elastic member and the second elastic member are a compression spring.

8. A fluid control valve with mechanical switch, comprising:
   a hollow tube body comprising a through hole, with an entrance and an exit disposed on two ends of the tube body, and a seat portion disposed in the through hole, the seat portion comprising a bore extending along an axial direction of the tube body;
   a rod body movably passing through the bore, with one end of the rod body extending toward the entrance and having a block member, and another end of the rod body extending toward the exit and having a valve plate, the valve plate opening or closing the exit according to an axial movement of the rod body along the axial direction;
   a first elastic member mounted around the rod body and arranged between the seat portion and the block member, the first elastic member being pressurized to be provided with a first prestress for an elastic recovering process;
   a second elastic member mounted around the rod body and arranged between the seat portion and the valve plate, the second elastic member being pressurized to be provided with a second prestress for an elastic recovering process; and
   at least an adjustment member disposed on the rod body for adjusting a compression level of the first elastic member and/or the second elastic member, so as to adjust the first prestress to be greater than the second prestress for the valve plate to normally close, or to adjust the second prestress to be greater than the first prestress for the valve plate to normally open;
   wherein the tube body has a ring flanged disposed on one end thereof provided with the exit.

* * * * *